April 24, 1962 F. M. MINIK 3,030,784
UNIVERSAL JOINT
Filed Nov. 9, 1960
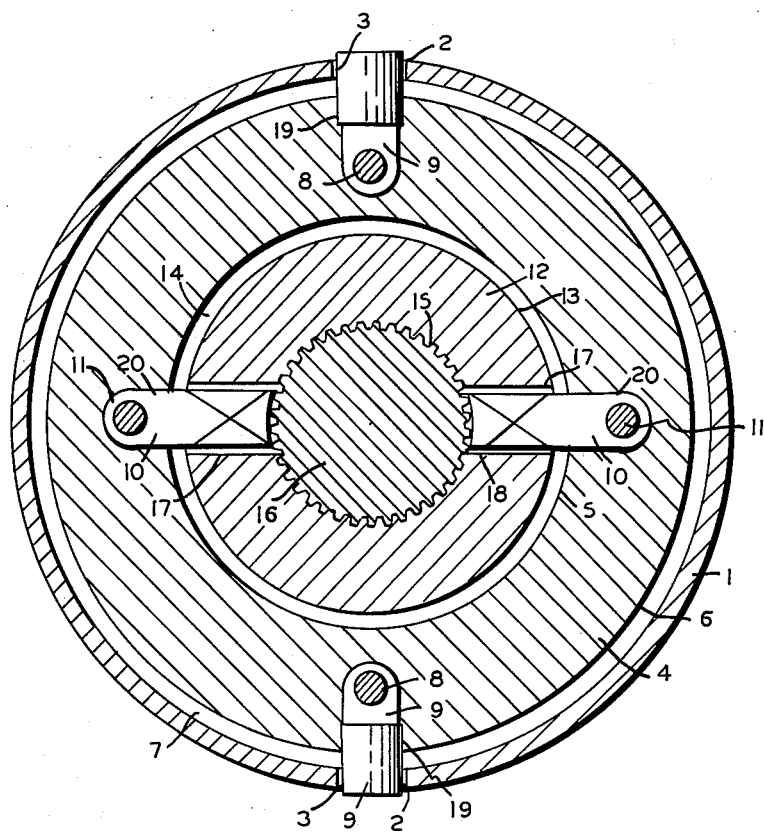
INVENTOR.
FRANK M. MINIK

United States Patent Office 3,030,784
Patented Apr. 24, 1962

1

3,030,784
UNIVERSAL JOINT
Frank M. Minik, 719 Allison St., North Apollo, Pa.
Filed Nov. 9, 1960, Ser. No. 68,239
2 Claims. (Cl. 64—18)

This invention relates generally to universal rotative transmission joints, and is specifically concerned with new and improved structure relating to such joints.

Conventional universal transmission joints such as those used in vehicle transmission contain a number of moving parts each of which involves exposed areas which become subject to wear and eventual failure. Further, in order to obtain sufficient torque strength, the coupling or joint must be relatively large and generally exceeds the dimensions of the connecting shafts.

It is therefore a primary object of this invention to provide a universal joint for transmissions which may be completely housed within the transmission shaft to afford protection for the same from contamination and wear due to dirt and foreign inclusions.

It is a further object of this invention to provide a universal joint for transmissions which is extremely compact in both axial and radial dimensions.

It is a still further object of this invention to provide a universal joint of the above class which contains a minimum number of components for simple assembly and replacement.

The invention comprises two concentrically assembled rings spaced with respect to each other and within the same plane. The outer ring is freely received within the end of a hollow drive shaft to which it is pivotally secured by two diametrically opposed pins each firmly anchored within the ring. The inner ring is supported within the outer ring by inwardly directed pins disposed at right angles but in the same plane as the first mentioned pins. The inner ring is thus permitted to pivot in a normal plane with respect to that of the outer ring. The inner ring has a central bore which is suitably splined to lockingly engage with a transmission shaft.

A full understanding of the construction of this invention, together with further novel features and advantages, will be had from the following detailed description of a preferred embodiment thereof, taken in conjunction with the attached drawing which shows a cross sectional end view taken through the universal joint.

The numeral 1 represents a tubular drive shaft. Two diametrically opposed holes 2 are formed radially through the hollow shaft and receive a bearing sleeve 3. The sleeve may if desired comprise a needle or ball bearing race. Received within the shaft 1 is a ring 4 which has a concentric bore 5. The ring has an outer periphery 6 which is convexly curved across the depth of the ring and permits an annular clearance indicated at 7. Radially extending holes 19 are drilled into the periphery 6 at diametrically opposed points so as to align with the bearing sleeves 3 formed through the drive shaft. Anchored within the holes by means of axially extending bolts 8 are two radially projecting pins 9 which are adapted to rotate within the bearing sleeves 3. From

2 the view shown in the drawing, the ring is adapted to rotate on the pins 9 in a horizontal plane. Two further holes 20 are formed in a diametrically opposed manner in the concentric bore 5. The holes are adapted to receive radially inwardly extending pins 10 which may be locked within the holes by axially extending bolts 11.

The radially extending pins 10 are adapted to rotatably mount an inner ring 12 in a vertical plane as viewed in the drawing. The inner ring has a peripheral surface 13 which is axially convex and is supported such that an annular space 14 is formed between the two rings 4 and 12. The ring has a concentric splined bore 15 which is adapted to engage with the splined end of a transmission shaft 16. Diametrically opposed holes 17 are formed through the ring 12 to receive needle bearings 18 for engagement by the radially extending pins 10.

The assembly of the joint is simple and is carried out by positioning the outer ring 4 within the drive shaft 1 and inserting the pins 9 through the shaft and into the ring holes 19 whereupon they are suitably locked in position by axially extending bolts 11. The inner ring 12 is now positioned within the outer ring and the pins 10 are inserted from within the ring bore 15 and are locked within the outer ring by inserting the radially extending bolts 11. The transmission shaft may now be inserted in the bore 15 and the universal joint is ready for operation.

From the foregoing, it is believed that the construction, operation and advantages of this invention will be fully apparent. However, since numerous modifications will occur to those skilled in the art, it is not desired to limit the construction exactly to that shown and described, and accordingly, modifications and equivalents may be resorted to, falling within the scope of the appended claims.

I claim:

1. A universal joint for rotatably connecting a hollow drive shaft with a transmission shaft, and comprising an outer ring disposed within one end of the drive shaft, said ring mounting two diametrically opposed projecting pins for engaging in radially disposed holes formed in the hollow drive shaft, an inner ring concentrically mounted within the outer ring and receiving diametrically opposed pins extending inwardly from the outer ring, a splined bore formed concentrically through the inner ring adapted for engagement by a transmission shaft, and means removably extending axially into the outer ring for retaining the pins in the outer ring.

2. A universal joint according to claim 1 wherein said means comprises axially extending bolts adapted to releasably engage through holes formed in the outwardly directed ends of the pins.

References Cited in the file of this patent

UNITED STATES PATENTS

| 299,470 | Grondahl | May 27, 1884 |
| 718,097 | Crompton | Jan. 13, 1903 |
| 1,267,374 | Burkholder | May 28, 1918 |
| 2,151,393 | Randolph | Mar. 21, 1939 |
| 2,768,698 | Fabian | Oct. 30, 1956 |